United States Patent [19]

Giallorenzi

[11] Patent Number: 5,208,650
[45] Date of Patent: May 4, 1993

[54] THERMAL DILATION FIBER OPTICAL FLOW SENSOR

[75] Inventor: Thomas G. Giallorenzi, Springfield, Va.

[73] Assignee: The United States of America as represented by the Secretary of the Navy, Washington, D.C.

[21] Appl. No.: 767,189

[22] Filed: Sep. 30, 1991

[51] Int. Cl.$^5$ .................................................. G01B 9/02
[52] U.S. Cl. ...................................... 356/345; 356/44; 250/227.27; 73/204.16
[58] Field of Search ............................ 356/345, 43, 44; 73/204.11, 204.16, 204.17, 204.13; 250/227.19, 227.27

[56] References Cited

U.S. PATENT DOCUMENTS

| | | | |
|---|---|---|---|
| 1,285,868 | 11/1918 | Wilson | 73/204.16 |
| 1,476,762 | 12/1923 | Meyer et al. | 73/204.16 |
| 3,683,692 | 8/1972 | Lafitte | 73/204 |
| 4,437,761 | 3/1984 | Kroger et al. | 356/43 |
| 4,627,728 | 12/1986 | Willson | 356/345 |
| 4,688,425 | 8/1987 | Kanehara et al. | 73/204.16 |
| 4,703,175 | 10/1987 | Salour et al. | 250/227 |
| 4,714,829 | 12/1987 | Hartog et al. | 250/227 |
| 4,755,668 | 7/1988 | Davis | 250/227 |
| 4,873,989 | 10/1989 | Einzig | 356/345 |
| 4,918,492 | 4/1990 | Ferdinand et al. | 356/345 |

*Primary Examiner*—Samuel A. Turner
*Attorney, Agent, or Firm*—Thomas E. McDonnell; Edward F. Miles

[57] ABSTRACT

A thermal dilation type optical flow sensor includes an optical heating source for heating a flowing fluid and a sensor disposed in a downstream direction from said heating source wherein the sensor includes a probe for varying a reflected light according to the temperature of the probe, a Michelson type interferometer for measuring the temperature of the probe according to the phase of the reflected light, and a calculating device for determining the flow rate based on the temperature of the probe, the distance between the heating source and the probe, and the amount of heat produced by the heating source. In an alternative embodiment, a thermal dilation type optical flow sensor includes a reflecting probe disposed in a flowing fluid for reflecting an incident light with a phase varied according to the probe temperature, an optical heater for heating the probe with a predetermined heat, and a calculating device for calculating a flow rate based on the predetermined heat and the phase of the reflected light.

3 Claims, 2 Drawing Sheets

THERMAL DILATION FIBER OPTICAL FLOW SENSOR

BACKGROUND OF THE INVENTION

The present invention relates to an optical flow sensor for measuring the flow of a fluid. More particularly, the optical flow sensor is a thermal dilation type sensor where a probe is heated and the temperature to which the probe is heated varies according to the flow of fluid past the probe. The invention more particularly relates to a Michelson type optical fiber interferometer and its application in measuring the temperature of the probe.

In order to measure the flow of a fluid accurately, it is necessary to employ a flow sensor that measures mass flow. There are two approaches to achieve this measurement: a Cordilis based flow sensor and thermal dilation flow sensor. In the former type, electrical power is required to vibrate the Cordilis sensing element whereas conventional thermal dilation sensors require electric power at the sensor head to heat the probe. These sensors have a substantial amount of metal (e.g. thermocouples, electric wires, etc.) and thus are susceptible to electromagnetic pickup and radiation, and have a sparking potential. Such a sensor would be undesirable when measuring, for example, the flow of a fuel-air mixture into a combustion type engine, or when located in close proximity to circuitry whose operation could be harmed by spurious electromagnetic radiation. This is especially important in areas where space is at a premium, such as aircraft or an oceangoing vessel.

There are examples of non-standard flow sensors which are relevant to the problems discussed above. For example:

U.S. Pat. No. 4,918,492 to Ferdinand et al. describes an interferometer for the measurement of temperatures in, for example, turbo-machines. One arm of the interferometer terminates in a sensor sensitive to the physical phenomenon to be evaluated and comprised of a hollow and open cell for receiving a part of a fluid to be measured and a mirror for returning the measurement optical wave. Ferdinand et al. do not disclose a heating means which is requisite for constructing a dilation type flow sensor.

U.S. Pat. No. 3,683,692 to Lafitte describes an apparatus to compute and measure the flow of a gaseous fluid by measuring a quantity of heat necessary to raise the temperature of a fluid of a given quantity, comprising a sensing means disposed in the gaseous flow and a reference means disposed in a dead-end cavity in such a manner as to be insensitive to the flow of fluid in this cavity. The sensing means and the reference means comprise a heating resistor to continually heat the fluid in order to raise its temperature and a detecting element sensitive to the temperature, the sensing means also including a heat compensating resistor whose electrical current supply is regulated by a lack of balance between the two detection elements for maintaining the elevation of temperature of the fluid flowing past the sensing means, and a means to continually measure the amount of current passing through the heat compensating resistance. The Lafitte apparatus uses electrical heating means which may be dangerous around fuel-air mixtures.

U.S. Pat. No. 4,755,668 to Davis describes a fiber optic interferometric thermometer with serially positioned fiber optic sensors comprising a single optical fiber and a means for enabling a temperature to vary the phase of light in several well-specified regions of the optical fiber. The sensing system consists of a Fabry-Perot type interferometer connected at one arm to the end of the optical fiber sensor. The optical fiber sensor is separated from the remainder of the optical fiber by a half-silvered mirror. The other end of the sensor region is fully mirrored. Thus, light is divided by the half-silvered mirror, so that one part of the light incident on the sensor is reflected back toward the coupler by the half-silvered mirror and constitutes the reference beam. The other part is transmitted into the optical fiber sensor portion and constitutes the sensor beam. The sensor beam experiences an added phase shift compared to the reference beam due to an added path length and the effect of the parameter being measured. The sensor component of the beam is then reflected by the full mirror at the end and passes once more through the sensor region experiencing an additional phase shift and is transmitted back through the half-silvered mirror and is interferometrically combined at the half-silvered mirror with the reference beam initially reflected by the half-silvered mirror. The fiber optic sensor region varies the phase of the light reflected from the mirrored end of the sensor according to the temperature of the sensor.

However, none of these sensors are fully satisfactory as a flow sensor, or for use in close proximity to electronic circuitry, or volatile chemicals. The present invention is aimed at eliminating these problems while at the same time affording greater flow measurement sensitivity.

SUMMARY OF THE INVENTION

Accordingly, an object of the present invention is to overcome the aforementioned drawbacks in the known art. In particular:

An object of the invention is to permit the use of flow sensors in close proximity to electronics, without the sending or receiving of spurious electromagnetic signals.

Another object is to permit operation of flow sensors safely in the vicinity of volatile fluids, without danger of sparking.

Another object is to permit flow sensors to operate with little or no metallic components.

Another object is to permit such flow sensors to be especially compact.

In accordance with these and other objects made apparent hereinafter, the invention provides an all optical flow sensor comprising an optical heating means for heating a flowing fluid and a sensor means disposed in the fluid in a downstream direction from the heating means, the sensor means determining a flow rate of the flowing fluid and comprising a probe means for measuring a temperature of the fluid.

According to another aspect of the invention, the optical flow sensor comprises a probe reflecting means disposed in a flowing fluid for reflecting incident coherent light within a light pipe wherein a phase of the reflected light within the light pipe with respect to the phase of the incident light varies according to a temperature of the probe means. The optical flow sensor further comprises an optical heating means for heating the probe means and a phase measurement means for measuring the phase of the reflected light with respect to the phase of the incident light, and a calculating means for determining the flow rate based on the relative phase of the reflected light.

Such a flow sensor is constructed substantially wholly of optical, rather than metallic, components. The sensor is thus isolated electromagnetically from its surroundings, has no components that can spark, and can be built very compactly because of the inherently small nature of optical fibers.

BRIEF DESCRIPTION OF THE DRAWINGS

The invention will be apparent from the following description of the preferred embodiments with reference to the accompanying schematic figures wherein:

Drawing

FIG. 1 illustrates a first embodiment of the optical flow sensor;

FIG. 2 illustrates a second embodiment of the optical flow sensor;

FIG. 3 illustrates a third embodiment of the optical flow sensor;

FIG. 4 illustrates a reflecting means;

FIG. 5 illustrates a first embodiment of the probe means;

FIG. 6 illustrates a second embodiment of the probe means; and

FIG. 7 illustrates a third embodiment of the probe means.

DETAILED DESCRIPTION OF THE PREFERRED EMBODIMENTS

Figure 1:
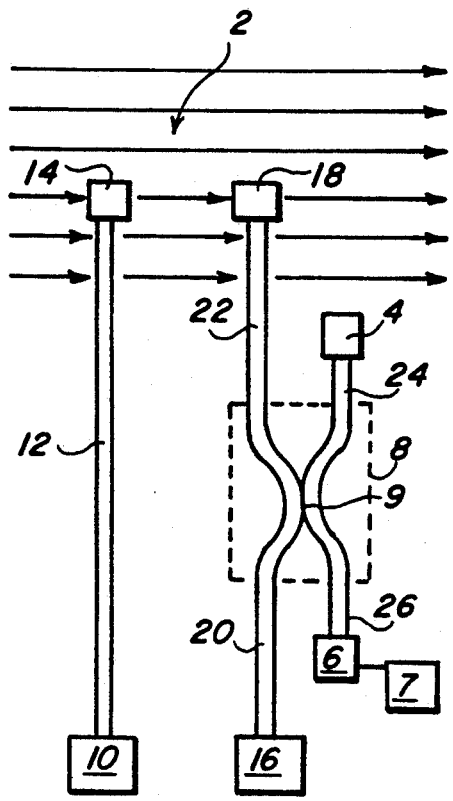

FIG. 1 illustrates a first embodiment of the invention. In this embodiment, optical heating means 14 and probe means 18 are disposed in flowing fluid 2. Optical heating means 14 is supplied with heating light through light pipe 12 from optical heating source 10. In operation, light generated in light source 10 passes through optical pipe 12 and a predetermined amount of heat is absorbed in heating means 14 to thereby heat a proximal portion of flowing fluid 2.

It will be appreciated that the temperature of heating means 14 will rise based on the predetermined amount of heat, and will be limited by the amount of heat transferred to flowing fluid 2, which is based on the mass flow rate and temperature of flowing fluid 2. It will also be appreciated that the portion of flowing fluid 2 proximal to heating means 14 will rise according to the amount of heat transferred thereto and the specific heat capacity of flowing fluid 2.

Probe means 18 is disposed at a predetermined distance in a downstream direction from heating means 14. Operatively connected to said probe means is a sensor means comprised of elements 4, 6, 8, 16, 20, 22, 24 and 26, which together comprise a Michelson type interferometer. Coherent light from light source 16 drives the interferometer. A first light pipe is comprised of first end 22, second end 20 and a portion of coupler 8. A second light pipe is comprised of first end 24, second end 26 and another portion of coupler 8.

Coherent light source 16 transmits light through second end 20 into coupler 8 where the light is divided and a first portion of the light travels through first end 22 of the first light pipe toward probe means 18 and a second portion of the light travels through first end 24 of the second light pipe toward reflecting means 4. Light traveling through first end 24 toward reflecting means 4 is wholly reflected back through first end 24 toward coupler 8 where a portion of this reflected light travels through second end 26 of the second light pipe toward detector means 6.

Meanwhile light travelling through first end 22 of the first light pipe toward probe means 18 is wholly reflected back through first end 22 of the first light pipe toward coupler 8 where a portion of this reflected light travels through second end 26 of the second light pipe toward detector means 6. In operation, the portion of light that is reflected from each of probe means 18 and reflecting means 4 and travels through second end 26 of the second light pipe toward detector means 6, constructively or destructively interfering with each other at juncture 9 of coupler 20, 22 and 24, 26, according to the relative phase of the two reflected lights. Accordingly, the amplitude detected by detecting means 6 depends on their relative phase.

Probe means 18 reflects a reflected light having a phase relative to an incident light that varies according to the temperature of probe means 18. In this first embodiment, probe means 18 takes on the temperature of flowing fluid 2 which is proximal to the probe means. In operation, heating means 14 is heated by a predetermined quantity of heat which in turn heats flowing fluid 2 according to the temperature of heating means 14 relative to the temperature of flowing fluid 2. The heated flowing fluid flows past probe means 18 decreases in temperature by a predetermined amount by diffusion of heat as the fluid flows from heating means 14 to probe means 18 which takes the temperature of the heated flowing fluid proximal to probe means 18. Dilation principles determine the temperature to which the flowing fluid is heated by heating means 14 according to the mass flow rate of flowing fluid 2. That is, the slower that fluid 2 flows, the longer any portion of it will be adjacent heater 14, and the hotter the fluid will become. The exact relationship between temperature and flow rate can be calibrated in situ. Therefore, by measuring the temperature induced deformation, or change in refractive index, of probe means 18 which has taken on the temperature of the proximal flowing fluid, the mass flow rate can be determined. Probe means 18 expands or contracts, thermally, in response to the temperature of the flowing fluid so that the phase of light reflected from probe means 18 relative to the light incident on probe means 18 varies according to the temperature of the probe means 18. It will be appreciated that other means for varying reflected phase according to temperature may substitute for the thermal expansion means. For example, properly selected materials that vary refractive index with temperature may be incorporated in probe means 18. The temperature dependent phase of light reflected from probe means 18 causes constructive and destructive interference with reflected light from reflecting means 4 as viewed at detecting means 6. This interference causes the signal detected by detecting means 6 to vary in amplitude according to the temperature of probe means 18. Calculating means 7 transforms the amplitude of the detected signal from detecting means 6 into a signal representative of the mass flow rate of flowing fluid 2 according to conventional dilation sensor principals.

Coupler 8 can be a conventional fused-fiber coupler, with fiber arm 20, 22 fused to arm 24, 26 at 9. Heater 12, 14 could be a simple heated metal wire, although this might lead to possible short circuits, and/or sparking. To avoid this, heater 12, 14 is preferably made entirely of optical material, with an absorptive termination to effectively dissipate optical energy from source 10 in fluid 2.

Figure 2:
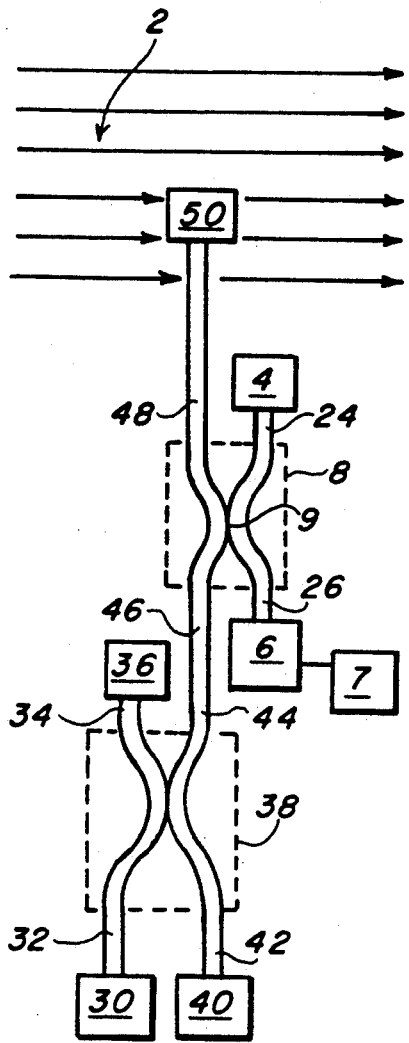
FIGS. 1-3 are schematics.

FIG. 2 illustrates a second embodiment of the invention. In this embodiment, flowing fluid 2 flows past probe means 50. Probe means 50 is operatively connected to first end 48 of a first light pipe. In operation, two lights, a coherent light and a heating light, are transmitted from coupler 8 through first end 48 toward probe means 50. Probe means 50 absorbs at least a portion of the heating light and wholly reflects substantially all of the coherent light. In this embodiment, heating source 30 serves an analogous function to heating source 10 of the first embodiment and light source 40 serves an analogous function in this embodiment to light source 16 of the first embodiment. Heating source 30 transmits an optical heating light through light pipe end 32 into fused-fiber coupler 38 where at least a portion of the heating light is coupled into light pipe end 44 traveling towards coupler 8. Light source 40 transmits coherent light through light pipe end 42 into coupler 38 where at least a portion of the coherent light travels through light pipe end 44 toward coupler 8. Any portion of either heating light from source 30 or coherent light from source 40 that does not travel through light pipe end 44 will travel through light pipe end 34 into absorbing means 36 where it is dissipated as unused heat.

The combination of heating light and coherent light travels through light pipe end 44, through light pipe end 46 and into coupler 8. A portion of the combined light travels through coupler 8 through light pipe end 48 toward probe means 50. Heating light from source 30 is at least partially absorbed by probe means 50 so as to heat probe means 50 with a predetermined quantity of heat. Coherent light from source 40 traveling through light pipe end 48 toward probe means 50 is wholly reflected. Light reflected from probe means 50 travels back through light pipe end 48 into coupler 8 where at least a portion travels through light pipe end 26 toward detecting means 6.

Meanwhile the combined light from both source 30 and source 40 which travels through light pipe end 44 through light pipe end 46 through coupler 8 and through light pipe end 24 towards reflecting means 4 is wholly reflected at reflecting means 4. This reflected combined light travels back through light pipe end 24 through coupler 8 where at least a portion of this reflected light travels through light pipe end 26 toward detecting means 6. Detecting means 6 is responsive to coherent light from light source 40 and non-responsive to heating light from heating source 30. It will be appreciated that heating light from heating source 30 need not be coherent and may be of considerably different wavelength than coherent light from light source 40. Well known filters are available which permit the separation of optical signals which are very close to one another in frequency. It will also be appreciated that detecting means 6 need not be non-responsive to heating light from light source 30 if substantially all of incident heating light on probe means 50 and on reflecting means 4 is absorbed in probe means 50 and reflecting means 4, respectively. Again, this can be done by the judicious choice of well known and commonly available optical filters.

In operation, a predetermined quantity of heat is absorbed in probe means 50. Because probe means 50 is disposed in said flowing fluid and is heated by a predetermined quantity of heat, probe means 50 will experience a temperature rise limited by the amount of heat transferred to flowing fluid 2, which is based on the mass flow rate and temperature of flowing fluid 2. Thus, in this embodiment, the temperature of probe means 50 is responsive to the mass flow rate and temperature of flowing fluid 2 in a way analogous to the way probe means 18 of the first embodiment is responsive to the mass flow rate and temperature of flowing fluid 2, that is to say the phase of coherent light reflected from probe means 50 relative to coherent light incident on probe means 50 varies according to temperature. It will be appreciated that elements 4, 6, 8, 24, 26, 46 and 48 of FIG. 2 comprise a Michelson type interferometer for measuring the temperature of probe means 50. It will be appreciated that the calculation of the mass flow rate of flowing fluid 2 by calculating means 7 in this second embodiment is substantially the same as the method for calculating the flow rate in the first embodiment, and will not be further described here.

Figure 3:
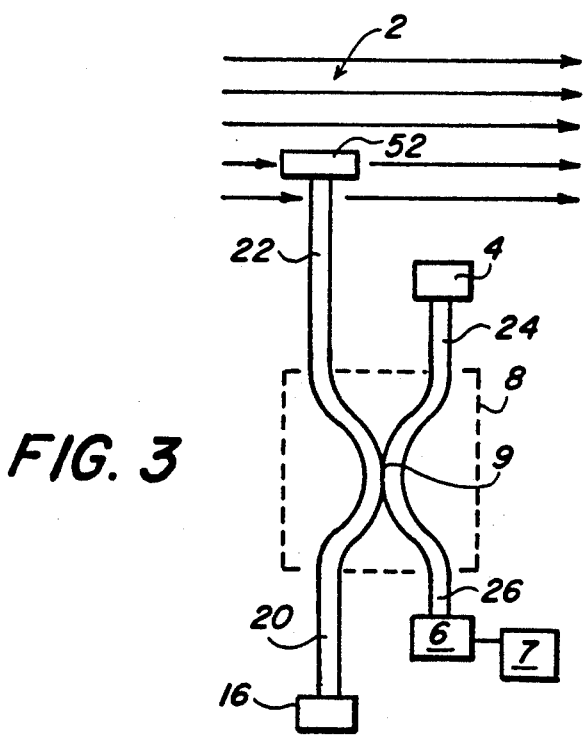

FIG. 3 illustrates a third embodiment of the invention. In this embodiment, flowing fluid 2 flows past probe means 52. Light source 16, detecting means 6, coupler 8, reflecting means 4, and light pipes 20, 22, 24 and 26 comprise a Michelson type interferometer substantially identical to the Michelson type interferometer of the first embodiment. Probe means 52 is comprised of a material that partially absorbs and partially reflects light from light source 16. In this embodiment, the portion of the light from light source 16 that travels through light pipe end 20 and light pipe end 22 and is absorbed by probe means 52 to produce a predetermined quantity of heat which constitutes the heat from the heating means. It will be appreciated that in all other aspects this embodiment functions substantially identical to the first embodiment and will not be further described here.

Figure 4:
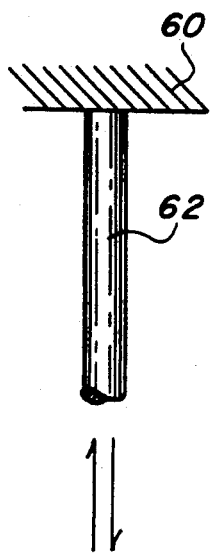
FIGS. 4-7 are elevational views, partly in section; in particular.

FIG. 4 illustrates a schematic view of reflecting means 4. In this view, reflecting material 60 is disposed on the end of optical fiber 62 so as to reflect substantially all of light incident on reflecting means 4.

Figure 5:
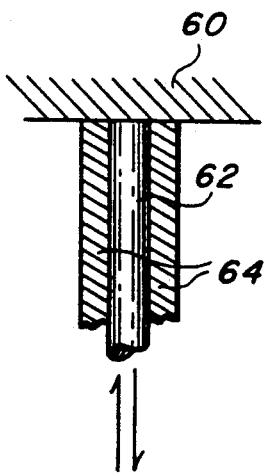

FIG. 5 illustrates a schematic view of a first variant of probe means 50. In this view, optical fiber 62 is clad with absorbing cladding material 64. At least a portion of the heating light incident on probe means 50 is absorbed in the absorbing cladding material 64 to thereby heat probe means 50 with a predetermined heat. Coherent light incident on probe means 50 is reflected from reflecting material 60 disposed on the end of optical fiber 62. In this variant, a portion of heating light incident on probe means 50 may be reflected back through optical fiber 62 while another portion is absorbed in absorbing cladding 64.

Figure 6:
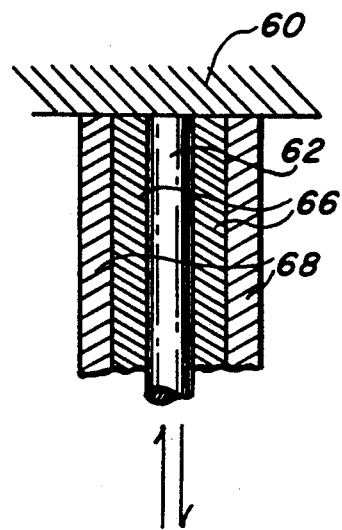

FIG. 6 illustrates a second variant of probe means 50. Light incident on probe means 50 travels through optical fiber 62 and is reflected back through optical fiber 62 by reflecting material 60 disposed on the end of optical fiber 62. Optical fiber 62 is clad in a non-absorbing cladding 66. The optical fiber clad in non-absorbing cladding is encased in absorbing fiber jacket 68. A portion of heating light incident on probe means 50 may be reflected back through optical fiber 62 and another portion is absorbed in absorbing fiber jacket 68 to generate a predetermined heat.

Figure 7:
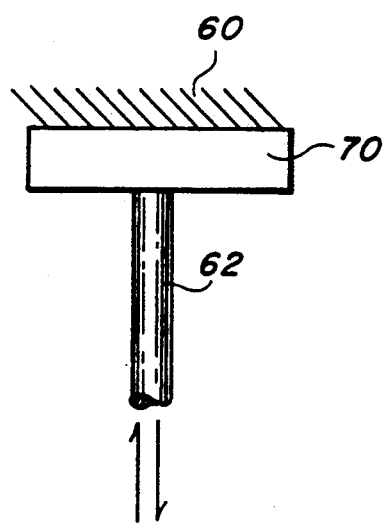

FIG. 7 illustrates a schematic view of probe means 52. Light incident on probe means 52 travels through optical fiber 62, then through probe material 70 to be reflected by reflecting material 60 disposed on one side of material 70 so as to travel back through probe material 70 and back through optical fiber 62. Probe material 70 partially absorbs the incident light, converting the absorbed portion of light into a predetermined quantity of heat.

It will be appreciated that additional embodiments are apparent from these teachings and consideration of various combinations of the described probe means and the descriptions of the operation of the first, second and third embodiments. The optical flow sensor described herein has advantages over prior art structures that heat a probe with electric current, in particular the sensitive measurement of flow rate without the hazards of sparking potential or interference from spurious electromagnetically radiation. These and other advantages will be appreciated from the disclosure herein.

The invention has been described with reference to its preferred embodiments which are intended to be illustrative and not limiting. Various changes may be made without departing from the spirit and scope of the invention as defined in the following claims.

What is claimed is:

1. A thermal dilation type optical flow sensor comprising:
   probe reflecting means disposed in a flowing fluid for reflecting incident coherent light within a light pipe, wherein a phase of a reflected light within said light pipe relative to a phase of said incident light varies according to a temperature of said probe means;
   optical heating means for heating said probe means with a predetermined heat; and
   measurement means for measuring said relative phase of said reflected light relative to said phase of said incident light and calculating said flow rate based on said relative phase of said reflected light relative to said incident light and said predetermined heat; and
   wherein said probe reflecting means comprises:
      an optical fiber disposed in said flowing fluid;
      an absorbing cladding on a portion of said optical fiber comprising a material for absorbing light wherein said optical heating means comprises said absorbing material; and
      a reflector disposed on a first end of said optical fiber, opposite to a second end connected to said measurement means.

2. A thermal dilation type optical flow sensor comprising:
   probe reflecting means disposed in a flowing fluid for reflecting incident coherent light within a light pipe, wherein a phase of a reflected light within said light pipe relative to a phase of said incident light varies according to a temperature of said probe means;
   optical heating means for heating said probe means with a predetermined heat; and
   measurement means for measuring said relative phase of said reflected light relative to said phase of said incident light and calculating said flow rate based on said relative phase of said reflected light relative to said incident light and said predetermined heat; and
   wherein said probe reflecting means comprises:
      an optical fiber disposed in said flowing fluid;
      a non-absorbing cladding on a portion of said optical fiber with an absorbing fiber jacket for absorbing light disposed therearound wherein said heating means is said absorbing fiber jacket; and
      a reflector disposed on a first end of said optical fiber, opposite to a second end connected to said measurement means.

3. A thermal dilation type optical flow sensor comprising:
   probe reflecting means disposed in a flowing fluid for reflecting incident coherent light within a light pipe, wherein a phase of a reflected light within said light pipe relative to a phase of said incident light varies according to a temperature of said probe means;
   optical heating means for heating said probe means with a predetermined heat; and
   measurement means for measuring said relative phase of said reflected light relative to said phase of said incident light and calculating said flow rate based on said relative phase of said reflected light relative to said incident light and said predetermined heat; and
   wherein said probe reflecting means comprises:
      an optical plate disposed in said flowing fluid, wherein said optical plate comprises a material for absorbing a portion of said light and said heating means heats the plate by the absorption of light energy in said material; and
      a reflector disposed on a first side of said optical plate, opposite to a second side of said optical plate connected to said measurement means.

* * * * *